US012384577B2

(12) United States Patent
Spencer

(10) Patent No.: US 12,384,577 B2
(45) Date of Patent: Aug. 12, 2025

(54) METHODS FOR SELECTIVELY CONTROLLING MOVEMENT OF A CONTACT LENS DURING A PACKAGING PROCESS

(71) Applicant: Bausch + Lomb Ireland Limited, Dublin (IE)

(72) Inventor: Geoffrey Spencer, Killure (IE)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 159 days.

(21) Appl. No.: 18/145,217

(22) Filed: Dec. 22, 2022

(65) Prior Publication Data

US 2024/0208685 A1    Jun. 27, 2024

(51) Int. Cl.
*B65B 25/00* (2006.01)
*B29D 11/00* (2006.01)
(Continued)

(52) U.S. Cl.
CPC ...... *B65B 25/008* (2013.01); *B29D 11/00125* (2013.01); *B65B 9/045* (2013.01);
(Continued)

(58) Field of Classification Search
CPC ....... B65B 9/045; B65B 25/008; B65B 35/56; B65B 55/22; B65B 61/00; B65D 81/22;
(Continued)

(56) References Cited

U.S. PATENT DOCUMENTS

| 5,794,412 A | * | 8/1998 | Ronconi et al. | ........ B65B 61/00 |
| | | | | 156/273.1 |
| 9,093,926 B2 | * | 7/2015 | Prahlad et al. | ...... B25J 15/0085 |

(Continued)

FOREIGN PATENT DOCUMENTS

| JP | 5466344 B1 * | 4/2014 | ........... B65B 25/008 |
| WO | 2005011966 A1 | 2/2005 | |

OTHER PUBLICATIONS

The CMM IQ Easy; Simpco Ion website; Product existed prior to Dec. 21, 2022.
(Continued)

*Primary Examiner* — Stephen F. Gerrity
(74) *Attorney, Agent, or Firm* — Simpson & Simpson, PLLC; Jeffrey B. Powers

(57) ABSTRACT

A method of selectively controlling movement of a contact lens in blister packaging comprising a cavity, the method comprising depositing an electric charge at a location in the cavity, securing the contact lens to the blister packaging at the location with the electric charge, and after the step of securing the contact lens, injecting a lens hydrating liquid into the cavity whereby the lens is hydrated and the securing terminated. A method of selectively controlling movement of a contact lens in blister packaging comprising a cavity, the method comprising depositing a droplet of a first lens hydrating liquid in the cavity, securing the contact lens to the blister packaging with the droplet, and after the step of securing the contact lens, injecting a second lens hydrating liquid into the cavity whereby the lens is hydrated.

13 Claims, 2 Drawing Sheets

(51) Int. Cl.
*B65B 9/04* (2006.01)
*B65B 35/56* (2006.01)
*B65B 55/22* (2006.01)
*B65B 61/00* (2006.01)
*B65D 81/22* (2006.01)
*B65D 85/00* (2006.01)

(52) U.S. Cl.
CPC .............. *B65B 35/56* (2013.01); *B65B 55/22* (2013.01); *B65B 61/00* (2013.01); *B65D 81/22* (2013.01); *B65D 85/54* (2013.01); *B65D 2585/545* (2013.01)

(58) Field of Classification Search
CPC .............. B65D 85/54; B65D 2585/545; B29D 11/00125
USPC .................................................. 53/425, 431
See application file for complete search history.

(56) References Cited

U.S. PATENT DOCUMENTS

| | | | | |
|---|---|---|---|---|
| 2003/0131862 | A1* | 7/2003 | Abraskin et al. ...... | A45D 31/00 132/73 |
| 2004/0026438 | A1* | 2/2004 | Tyra et al. .......... | B65D 25/205 220/660 |
| 2006/0232766 | A1* | 10/2006 | Watterson, Jr. et al. ................... | B29D 11/00125 356/124 |
| 2008/0079184 | A1* | 4/2008 | Yin et al. ............... | B29D 11/00 264/1.36 |
| 2015/0174839 | A1* | 6/2015 | Lomb et al. ..... | B29D 11/00125 264/1.36 |
| 2019/0046353 | A1* | 2/2019 | Greenwood et al. .. | B65D 85/00 |

OTHER PUBLICATIONS

CMME product specification; Product existed prior to Dec. 21, 2022.
IML Spider website info (user manual 1, 31-43; Product existed prior to Dec. 21, 2022.
Simpco Perfomax IQ Easy website info and user manual; pp. 1, 52-77; Product existed prior to Dec. 21, 2022.
Simco Pinner Series, Oct. 24, 2022; Product existed prior to Dec. 21, 2022.
Corona Treatment Wikipedia page (printed Feb. 28, 2025); https://en.wikipedia.org/wiki/Corona_treatment.

\* cited by examiner

METHODS FOR SELECTIVELY CONTROLLING MOVEMENT OF A CONTACT LENS DURING A PACKAGING PROCESS

FIELD

Methods and apparatus for controlling movement of a contact lens during a packaging process.

BACKGROUND

A current technique for packaging contact lenses involves placing a dry (i.e., unhydrated) hydrophilic lens into a cavity (also referred to as "a well") of empty blister packaging. The packaging typically comprises a plurality of separated wells; however, the packaging may comprise a web of wells.

After a lens is placed in each well, the packaging is transported to one or more stations where the lenses are further processed (e.g., inspected or hydrated). After processing, lid stock (e.g., an aluminum foil) is added to seal the lenses within the cavities and the lenses are heated (e.g., by autoclaving) to sterilize the lenses.

In instances where the packaging comprises individual wells, each blister can either be sealed with separate pieces of lid stock, or multiple blisters can be sealed with a single sheet of lid stock such that the blisters are connected by the lid stock. The plastic blister and lid stock form the primary packaging of the lenses. Typically, the packaged lenses are placed in secondary packing (e.g., cartons) for sale.

During transport of lenses prior to hydration, a lens located in a well is typically subjected to relatively high-speed travel between stations where the lenses encounter, for example, substantial acceleration and deceleration, movement around bends, vibration and/or movement between conveyors by pick-and-place machines. Because both the lenses and the wells are dry, there is little friction to a hold the lenses in place, resulting in relatively free movement of the lenses around the cavities of a web during transport, particularly if the wells are dome shaped. The result is uncertainty of lens position during processing, including when liquid is injected into the wells during the hydrating step.

An additional source of uncertainty in the position of a dry lens within a well arises from the possible presence of random static electricity in the wells. Such static electricity can cause a dry lens to move within the well and/or stick to a side of the well. For example, a common occurrence is that the wells have a slight negative charge and the dry lenses also have a slight negative static electricity charge. In those circumstances, the lens will be repelled by the well and will either bounce out of the well, or "float" above the well surface where the lack of friction will make lens movement likely. In some instances, static neutralizing devices have been employed to remove static electricity from a well prior to placing a lens in the well to avoid detrimental effects associated with uncertain positioning.

Movement of a lenses within wells presents a quality risk, as movement may result in one or more lenses sliding out of wells and onto the machinery or into neighboring wells during transport of the lenses.

Another quality risk arising from movement of a lens within a well is referred to as eversion, which refers to a lens being "inside out"; that is, rather than the lens concavity being formed on the posterior surface of the lens (to allow the posterior surface to conform a wearer's eye), the concavity if formed on the anterior surface. Eversion can occur by multiple mechanisms. For example, transport between stations may cause a lens to invert (i.e., flip over) within its well and subsequent hydration completes eversion of the lens causing the concavity to form on the anterior surface. Alternatively, if movement or static electricity causes a lens to move up a wall of a well, the force associated with the injection of the purified water or saline may cause a lens to evert.

Further complicating quality control of the lens packaging process is the fact that it may be difficult or impossible to detect that a lens is in an everted state using conventional machine vision equipment. A lens that is subjected to sterilization when in an everted state may have its dimensions permanently altered (e.g., the lens becomes flatter and wider) resulting in lens performance issues and/or comfort issues for a wearer.

SUMMARY

According to aspects of the present invention, a lens is temporarily attached to a well formed in packaging material, using a static charge or using a liquid. Typically, the location of attachment is a central location of a well (e.g., the center of a domed well). The attachment, itself, decreases or eliminates movement of a lens during the packaging process and increases the certainty of the position during packaging process. Additionally, in the event that movement does occur, the movement is less likely to pose a quality risk due to the lens beginning at a central location.

An aspect of the invention is directed to a method of selectively controlling movement of a contact lens in blister packaging comprising a cavity. The method comprises depositing an electric charge at a location in the cavity, securing the contact lens to the blister packaging at the location with the electric charge, and after the step of securing the contact lens, injecting a lens hydrating liquid into the cavity whereby the lens is hydrated and the securing terminated.

In some instances, the step of depositing the electric charge is achieved using a first electrode and a second electrode on opposing sides of the cavity. One of the electrodes may be a ground electrode. The deposited electric charge may be a negative charge.

In some instances, one of the electrodes is a negative electrode, and the negative electrode is located above a concave surface defining the cavity. The cavity may be dome-shaped.

In some instances, the step of depositing the electric charge comprises forming a linearly varying voltage signal between the electrodes. In other instances, the step of depositing the electric charge comprises forming a voltage of fixed magnitude between the electrodes.

The location may be a central location. The depositing may be achieved using a static charging device.

In some instances, the method further comprises sealing the cavity containing the contact lens and hydrating liquid with lid stock, and after the sealing step, autoclaving the packaged lens and hydrating liquid.

Another aspect of the invention is directed to a packaged contact lens, comprising blister packaging comprising a cavity, the cavity having a contact lens secured to a central location of the cavity by an electric charge.

Yet another aspect of the invention is directed to a method of selectively controlling movement of a contact lens in blister packaging comprising a cavity. The method comprises depositing a droplet of a first lens hydrating liquid in the cavity, securing the contact lens to the blister packaging with the droplet, and after the step of securing the contact lens, injecting a second lens hydrating liquid into the cavity whereby the lens is hydrated.

In some instances, the liquid is one of saline solution or purified water. The liquid may comprise an alcohol.

The droplet may be deposited at a central location.

In some instances, the second lens hydrating liquid is the same as the first lens hydrating liquid.

In some instances, the step of injecting the second lens hydrating liquid occurs after the droplet has evaporated to a point in time where the droplet no longer secures the lens.

In some instances, the step of injecting the second lens hydrating liquid occurs before the droplet has evaporated to a point in time where the droplet no longer secures the lens, whereby the step of injecting the second lens hydrating liquid terminates the securing of contact lens.

In some instances, the method further comprises steps of sealing the cavity containing the contact lens and hydrating liquid with lid stock, and after the sealing step, autoclaving the packaged lens and hydrating liquid.

Still another aspect of the invention is directed to a packaged contact lens, comprising blister packaging comprising a cavity, the cavity having a contact lens secured thereto by about 40-45 mL of lens hydrating liquid.

In some instances, the lens hydrating liquid is purified water.

The term "central location of a well (or a cavity)" is defined herein to mean within about 15 percent of the radial distance from the center of the well to the edge of the well as measured in a plane parallel to a plane including the edge of the well (i.e., the maximum outer dimension of the contour forming the well), and in some instances within about 10 percent of the radial distance from the center of the well to the edge of the well.

These and other aspects of the present invention will become apparent upon a review of the following detailed description and the claims appended thereto.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Aspects of the invention will be further illustrated with reference to the following specific examples. It is understood that these examples are given by way of illustration and are not meant to limit the claimed inventions beyond the language set forth in the claims.

Figure 1A:
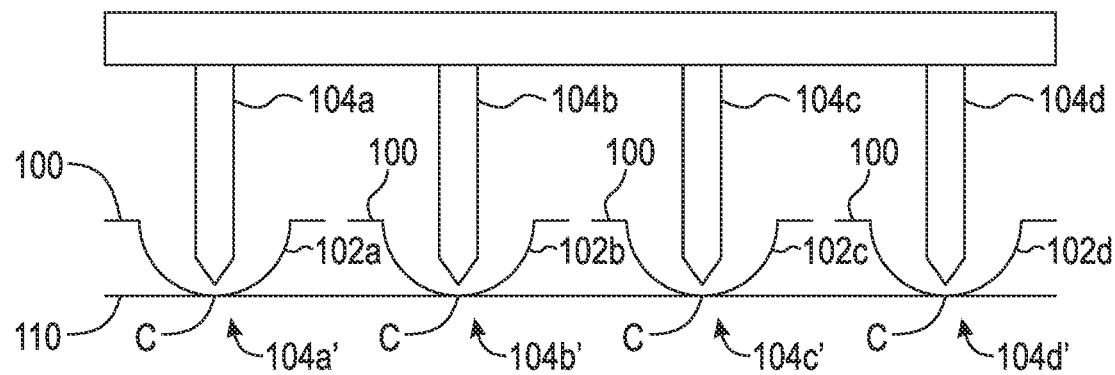
FIGS. 1A-1C are a series of schematic drawings illustrating an example of apparatus and steps for selectively controlling movement of a contact lens in blister packaging including a cavity according to aspects of the present invention.
Figure 1B:
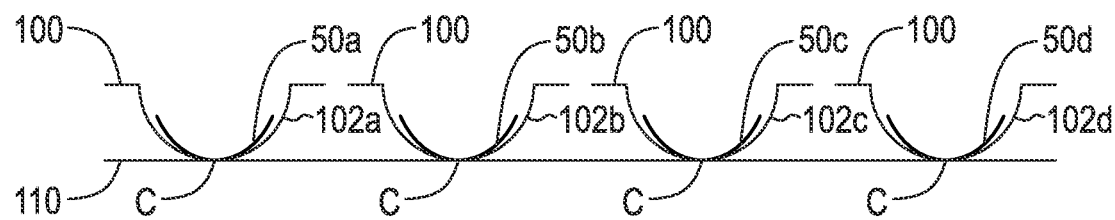
Figure 1C:
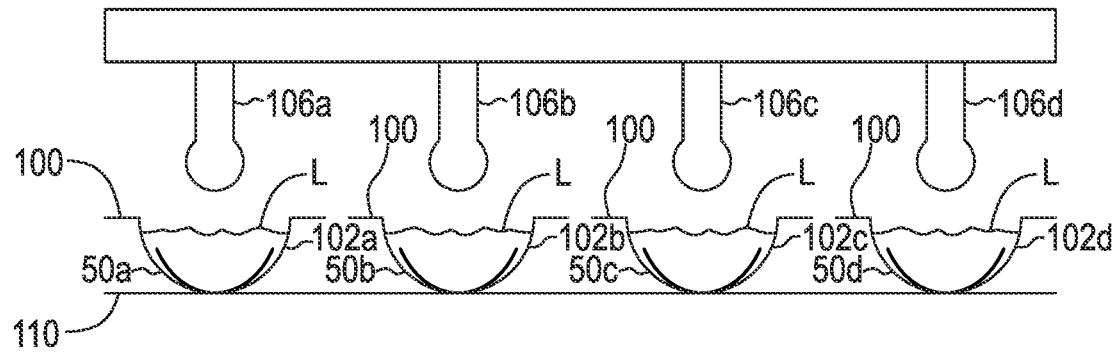

FIGS. 1A-1C are a series of schematic drawings illustrating an example of apparatus and steps for controlling movement of contact lenses 50a-50d in blister packaging 100 including cavities 102a-102d according to aspects of the present invention. For example, each drawing may correspond to a station where a contact lens (also referred to herein simply as a lens) is treated during the packaging process. While three steps are illustrated, one or more inspection or other steps may occur before, after or between the illustrated steps. Although four lenses in four wells are shown, according to aspects of the invention the steps may be applied to one or more lenses. Blister packaging 100 can be formed of separate parts each having a single well (as shown) or a web of connected wells.

As shown in FIG. 1A, an electric charge is deposited at a location in the cavities (i.e., on concave surfaces defining the cavities). For example, relatively negative and positive electrodes 104a-104d, 104a'-104d' are placed on opposing sides of a well; and a voltage sufficient to generate an arc between the electrodes is provided. In some instances, it is advantageous that one of the electrodes is a ground electrode. Typically, the charge is deposited at a central location of each well; however, the charge may be deposited at any location deemed to provide a suitably-low quality risk.

Upon the generation of the arc, a charge C is deposited on the surface of each well 102a-102d as a result of the arc passing through the well and ionizing the area. It will be understood, as discussed below, that the deposited charge may be negative or positive, depending on the configuration of the electrodes. Due to the insulative properties of the plastic constituting the wells 102a-102d, the charge remains localized proximate the location where the arc was formed. For example, the blister packaging may be made of polypropylene, polyethylene, polyvinylchloride, or polystyrene.

In the illustrated embodiment, a negative electrode 104a-104d is located above (and separated from) its corresponding well 102a-102d, and ground electrode 104a'-104d' is located below (and in contact with) its corresponding well. In particular, in the illustrated embodiment, the ground electrodes are provided by an electrically conductive (e.g., metal) pallet 110 on which the blister pack is located which in turn is connected to electrical ground. Because the wells 102a-102d are dome-shaped, the ground electrode may contact each of the wells at substantially a single point; alternatively, the blister is not in contact with the metal pallet but is close enough for an arc to occur and pass through the blister material. Accordingly, as the electrodes 104a-104d are lowered into the wells (e.g., to 4-15 mm above the bottom of the well), an arc is formed between the electrodes and charge is deposited at the bottom of each well.

For example, in some embodiments, to deposit the charge, a voltage signal is formed between the positive and negative electrodes associated with each well, the voltage signal varying linearly between −20 kV-+20 kV (kilovolts) over a period of 500 mS (milliseconds). After the charge is deposited, the electrodes 104a-104d are moved out of the wells and the blisters are moved to another station. Alternatively, a fixed voltage may be applied by the electrodes. For example, a fixed voltage of −14 kV over a period of 300-400 mS may be used to form the arc. For example, the result is a charge disposed on the packaging in an area of less than about 5 mm². In some embodiments, a charge present on the packaging (e.g., a random charge arising during manufacture) is neutralized before the charge is deposited by an arc.

In addition to the voltage setting of the ionizing equipment, the strength of the bond between a contact lens and a well is also influenced by the charge on the contact lens itself, thereby allowing for multiple different scenarios. Some contact lens designs, after manufacture, tend to be positively charged (~+3 kV) and so achieve stronger blister adhesion when the blister is negatively charged. For example, if a contact lens has a +6 kV charge on its surface, and the blister well is given a −6 kV charge, the lens would be expected to have a reasonably strong adhesion to the well. In cases where the lenses are negatively charged, applying a positive charge to the blister will give better adhesion. However, it will be understood that, if a contact lens was negatively charged to −6 kV and the blister well is given a −6 kV charge, the well would be expected to repel the lens. It is also to be understood that, if no charge was present on a lens (e.g., the charge is neutralized), a well could be provided with either a positive or a negative charge to provide adhesion.

It will be appreciated that the voltage polarity and strength present on a lens depends on the design and manufacture of a lens. For example, uncontrolled ion clouds may be present inside machine enclosures where a lens is to be manufactured as a result of poorly functioning anti-static equipment or may be the result of a charge sources. The charge polarity and strength provided to a well using a system as described above can be selected based on the type of lenses or blisters or automation in use.

An example of equipment that can be used to deposit a charge is summarized as follows (all manufactured by SIMCO-Ion, Technology Group of Hatfield, PA USA:

Performax IQ Easy for neutralizing a surface of static charge
IML spider electrodes and pin assemblies for delivering an arc to the surface
IML SPIDER charge distribution module
CMM IQ Easy for generating the charge
Manager IQ Easy, the human-machine-interface for managing the charge process A device comprising one or more electrodes to deposit a charge is commonly referred to as a static charging device or surface ionizing device. In some instances, electrodes 104a-104d are electrically coupled together via a charge distribution module (e.g., IML Spider), as shown, to facilitate uniform delivery of charge to the cavities. While the above-described techniques represent a few options for depositing a localized charge on a plastic substance, any suitable technique may be used.

As shown in FIG. 1B, the contact lenses 50a-50d are temporarily secured to the blister packaging 100 at the location with the electric charge C. The lenses may be loaded into the wells using any suitable conventional technique (e.g., manually or in an automated manner). As the lenses are loaded into the wells 102a-102d, the lenses cling to the charged location. It has been found that in some instances the charge is sufficient that the blister packs can be inverted (i.e., turned upside down) and shaken with the lenses remaining secured in their wells; however, any suitable amount of charge may be used to reduce the risk of movement to a suitable level. It will be appreciated that a lens secured by the charge can be transported between stations during the packaging process with a reduced occurrence of quality risks.

As shown in FIG. 1C, after the step of placing the contact lenses 50a-50d (as shown in FIG. 1B) is completed and after any high-risk transport, lens hydrating liquid L is injected into the cavities whereby lenses 50a-50d (which are made of a conventional hydrophilic material) are hydrated and the securing of the lenses is terminated. That is, conventional lens hydrating liquid (e.g., saline or purified water) is applied from nozzles 106a-106d to the well in a conventional manner, and in an amount conventional for packaging a lens such that the localized charge is dissipated, thereby releasing the lenses from the walls of the cavities. Significantly, upon application of the hydrating liquid, the lens is freed from the surface of the well and the lens within the packaging behaves in a manner as if a charge were never applied.

Figure 2A:
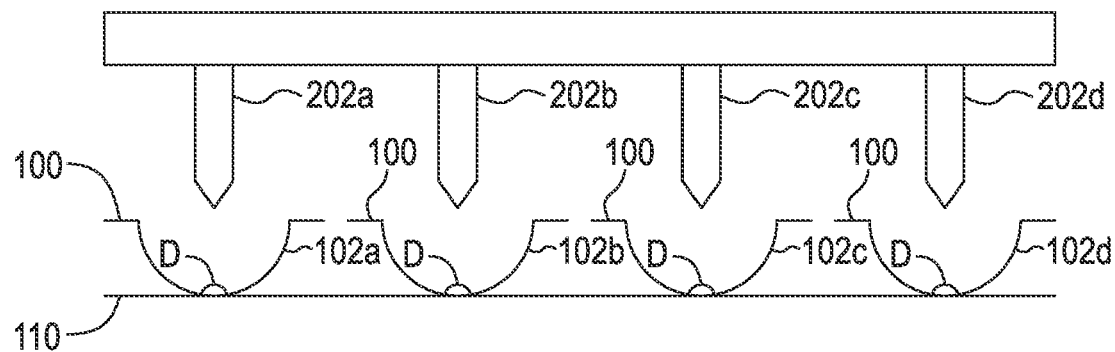
FIGS. 2A-2C are a series of schematic drawings illustrating another example of apparatus and steps for selectively controlling movement of a contact lens in blister packaging according to aspects of the present invention.
Figure 2B:
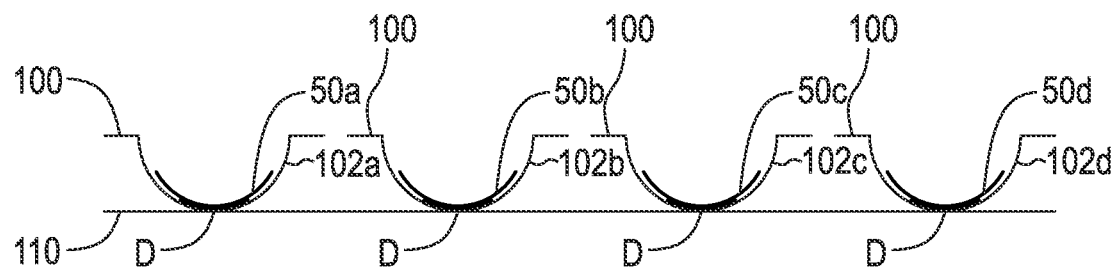
Figure 2C:
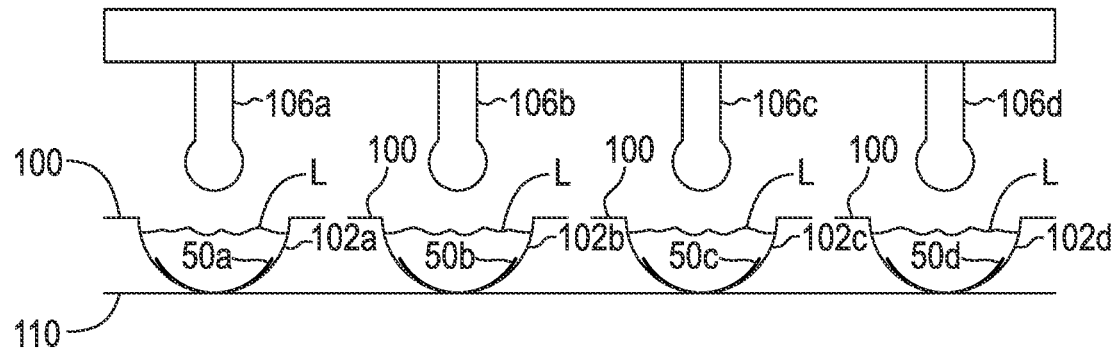

FIGS. 2A-2C are a series of schematic drawings illustrating another example of apparatus and steps for controlling movement of contact lenses 50a-50d in blister packaging 100 according to aspects of the present invention.

As shown in FIG. 2A, droplets D of a first lens hydrating liquid are deposited in cavities 102a-102d by nozzles 202a-202d. The volume of the droplets is about 40-45 mL (milliliters) of liquid. The volume of the droplets is selected such that the volume is neither too much such lenses 50a-50d risk floating on top of the liquid (separated from the well walls), nor too little such that the lens does not remain adhered to the well walls. The liquid may be such that it is safe to be applied to a wearer's eye or such that it evaporates prior to the lens being applied to a wearer's eye. For example, a hydrating liquid may be purified water or saline or an alcohol such as isopropyl alcohol. Typically, the droplet is deposited at a central location of each well; however, the droplet may be deposited at any location deemed to provide a suitably-low quality risk. In some instances, nozzles 202a-202d are fluidly coupled together, as shown, to facilitate facilitate delivery of droplets in a plurality of cavities or a web of cavities.

As shown in FIG. 2B, contact lenses 50a-50d are secured to the blister packaging 100 with droplets D which are illustrated as spread across the lenses and well walls. Lenses 50a-50d may be loaded into the cavities 102a-102d using any suitable conventional technique (e.g., manually using tools or in an automated manner). As the lenses are loaded into the wells, the lenses adhere to the well walls, likely do to the adhesion properties of the liquid within the lens to the liquid on the wall and/or cohesion between liquid and the plastic. Additionally, as the water is absorbed by the lens, the lens shape may change (local to where the water is absorbed) so that the lens has a greater contact area with the well, thereby adding to the lenses' resistance to movement.

As shown in FIG. 2C, after the step of placing contact lenses 50a-50d is completed and after any high-risk transport a second lens hydrating liquid is injected into the cavities 102a-102d. Application of the second lens hydrating liquid by nozzles 106a-106d may be achieved using a conventional lens hydrating liquid (e.g., saline or purified water) in a conventional manner, and in an amount conventional for packaging contact lenses. Application of the second lens hydrating liquid in such a volume that the lenses (which are made of a conventional hydrophilic material) absorb the second hydrating liquid, and the second lens hydrating liquid terminates the cohesive/adhesive properties achieved by the droplets D and releases lenses 50a-50d from the well walls. The first lens hydrating liquid and the second hydrating liquid may be the same as one another or different. Significantly, upon application of the hydrating liquids, the lenses are functionally unchanged and the lenses within the packaging behave in a manner as if droplets D were never applied.

It is to be appreciated that a droplet of hydrating liquid will evaporate with time. Accordingly, any transportation of a lenses 50a-50d that is to occur with the lenses attached to the walls of the cavities 102a-102d should occur prior to substantial evaporation of the droplets, such that the lenses remain sufficiently secured to the cavity walls during transport. In some instances, according to the invention, the droplets may fully evaporate after transport and before injection of the second lens hydrating liquid if the risk of lens movement within the wells associated with injecting the liquid (into a well containing a dry lens) is deemed to be low enough. It is to be appreciated that the amount of liquid in the droplets and the ambient air conditions (which affect evaporation) allow control of the evaporation of the droplet and therefor allow for selective control of movement of the lens. However, it is to be noted that, if the second hydrating liquid is injected prior to substantial evaporation of the first hydrating liquid, the step of injecting the second lens hydrating liquid into the cavities hydrates the lenses 50a-50d as well as terminates the securing.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of selectively controlling movement of a contact lens in blister packaging comprising a cavity, the method comprising:
   depositing a static electric charge at a location in the cavity;
   securing the contact lens to the blister packaging at the location with the static electric charge; and
   after the step of securing the contact lens, injecting a lens hydrating liquid into the cavity whereby the lens is hydrated and the securing terminated.

2. The method of claim 1, wherein the step of depositing the static electric charge is achieved using a first electrode and a second electrode on opposing sides of the cavity.

3. The method of claim 2, wherein one of the electrodes is a ground electrode.

4. The method of claim 2, wherein one of the electrodes is a negative electrode, and the negative electrode is located above a concave surface defining the cavity.

5. The method of claim 2, where in the step of depositing the static electric charge comprises forming a linearly varying voltage signal between the electrodes.

6. The method of the claim 2, wherein the step of depositing the static electric charge comprises forming a voltage of fixed magnitude between the electrodes.

7. The method of claim 1, wherein the static electric charge is a negative charge.

8. The method of claim 1, wherein the cavity is dome-shaped.

9. The method of claim 1, wherein the location is a central location.

10. The method of claim 1, wherein the depositing the static electric charge is achieved using a static electric charging device.

11. The method of claim 1, further comprising steps of:
    sealing the cavity containing the contact lens and hydrating liquid with lid stock; and
    after the sealing step, autoclaving the packaged lens and hydrating liquid.

12. The method of claim 1, wherein in the step of depositing the static electric charge, the static electric charge is disposed on the packaging in an area of less than about 5 $mm^2$.

13. The method of claim 1, wherein the location is a central location of the cavity.

* * * * *